3,130,065
NEW FLOCKED ARTICLES AND METHOD OF MAKING THEM
Joseph F. Manning and Donald J. McKendry, Newton Center, Mass., assignors to Interchemical Corporation, New York, N.Y., a corporation of Ohio
No Drawing. Filed Aug. 9, 1960, Ser. No. 48,364
6 Claims. (Cl. 117—33)

This invention is concerned with new flocked articles and with methods of making them. More particularly it relates to new flocked articles wherein the binder is comprised of carboxy-containing elastomers cured in admixture with polyfunctional imine crosslinking agents and to methods for making the flocked articles.

When metallic oxides such as zinc oxide or magnesium oxide are used for curing carboxy-containing butadiene-acrylonitrile rubbers, various difficulties are encountered particularly in the desirable step of adding the oxides as dispersions. Settling, caking, and other sources of non-uniformity are frequent problems. Incorporation of the oxides in the rubber dispersions as part of the manufacturing process causes instability. Curing temperatures required are rather high when metallic oxides are used.

Isocyanates were tried as curing agents but they gave very short, impractical pot lives.

It has now been found that both tris-(2-methyl-1-aziridinyl) phosphine oxide and tris-(2-methyl-1-aziridinyl) phosphine sulfide produce good pot lives and the rubber compounds into which they were incorporated cured to excellent wash and drycleaning fastness.

The following list serves to define more fully some of the terms used in this disclosure.

Hycar 1472—A solid carboxyl-containing butadiene-acrylonitrile copolymer of medium high acrylonitrile content in granular form.
Hycar 1300X2—A liquid carboxyl-containing butadiene-acrylonitrile copolymer of medium high acrylonitrile content.
Hycar 1571—A latex of carboxyl-containing butadiene-acrylonitrile copolymer.
Tipure FF—A grade of anatase titanium dioxide.
Cab-O-Sil—A highly aerated pure silica.
Cellosolve acetate—Ethylene glycol monoethyl ether acetate.
Butyl Cellosolve acetate—Ethylene glycol monobutyl ether acetate.
Methyl Cellosolve acetate—Ethylene glycol monomethyl ether acetate.

The examples that follow are given by way of illustration of the invention and are not to be considered as limitations.

*Example 1*

13.6 parts of Hycar 1472 were banded on a mill roll and 13.6 parts of Tipure FF worked in until the dispersion was uniform and complete. A heavy duty churn was charged with the resulting mixture plus 54.5 parts of Cellosolve acetate, 13.6 parts of Hycar 1300X2, 1.90 parts Cab-O-Sil and the material was churned until smooth. Before application to a substrate, the dispersion was thoroughly mixed with 2.7 parts of tris-2-methyl-1-aziridinyl) phosphine oxide. This material had a pot life of one hour at 75° F. After application of the adhesive and flock by standard methods, cure was effected by heating one hour at 200° F. The wash resistance ASTM D-435-52 Test #3) was excellent and the drycleaning resistance (perchloroethylene tumbling for one hour) was also excellent.

*Example 2*

The procedure described in Example 1 was repeated omitting the tris-(2-methyl-1-aziridinyl) phosphine oxide. The cured binder failed in both the wash resistance and the drycleaning resistance tests.

Results similar to Examples 1 and 2 were obtained with Hycar 1571 latex and also when using Hycar 1072 in admixture with Hycar 1472 and Hycar 1300X2 in a solvent system.

*Example 3*

The procedure of Example 1 was repeated but with tris-(2-methyl-1-aziridinyl) phosphine sulfide instead of tris-(2 - methyl - 1 - aziridinyl) phosphine oxide. The results were as favorable as in Example 1.

Besides Cellosolve acetate, other high boiling esters of glycol ethers were used, such as methyl Cellosolve acetate, butyl Cellosolve acetate, etc. Also found suitable were high boiling ketones, such as cyclohexanone, ethyl amyl ketone, etc. The amounts may be varied, the range 40–70 parts by weight being most suitable.

The polyfunctional imines may be used at least in the range of 5–15 phr.

We prefer anatase titanium dioxide as filler but other suitable substances may be used. The amount of filler is preferably in the range of 30–55 phr. If too much filler is used flexibility is reduced and susceptibility to cracking is increased. If too little filler is used the tendency to string is increased, solids are lower, and cost rises.

It will generally be found that at least two rubbers are desirable in order to adjust the viscosity and solids content to the range desired. As an illustration, Example 1 makes use of one solid and one liquid butadiene-acrylonitrile rubber of medium high acrylonitrile content, but of different viscosities, etc. At the ratios used the uncured binder was high in solids (44%) and had a workable viscosity. The system had a low tendecy to string and its drying time approached that of a moderately fast setting paint. Increasing the ratio of liquid to solid rubber would reduce the modulus of the cured film with resulting softness and susceptibility to abrasion. Increasing the ratio of solid to liquid rubber would increase the viscosity and the tendency to string and would reduce the solids in the uncured material. In Example 1, for instance, ratios outside of 60–30 parts of solid to 40–70 parts of liquid rubber would be inadvisable.

Besides Cab-O-Sil other similar thickeners may be used. Without a thickener the viscosity of the uncured material would be lower and the tendency to string and flow would increase. It was found that about 1 to 3 parts by weight of these fillers was a suitable range.

Curing is preferably carried out by heating to about 200° F. for about one hour. With higher temperatures less time is required and more time is needed at lower temperatures. It is convenient to use curing temperatures below 212° F. so that heating by steam may be utilized and also to minimize undesirable decomposition reactions.

The flock adhesives of this invention are valuable on substrates of leather, rubber, paper, and plastics both rigid and non-rigid, but they are particularly valuable for cloth of all kinds whether made of cotton, linen, wool, silk, or synthetic fibers alone or in combinations, both coated and uncoated. These applications, however, are given as illustrations and should not be construed as limitations.

What is claimed is:

1. In an article of manufacture a flocked coating comprising a substrate with adhering flock, the adhesion being due to a binder formed in situ by curing copolymers of butadiene and acrylonitrile containing carboxyl groups in the presence of a polyfunctional imine crosslinking agent.

2. The method of flocking which comprises (1) applying to the surface to be flocked a solution comprising high boiling solvent, a polyfunctional imine crosslinking agent, and copolymers of butadiene and acrylonitrile containing carboxyl groups, (2) flocking the wet surface, (3) heating the coating to cure the binder, and (4) cooling the article to about room temperature.

3. The method of flocking which comprises (1) applying to the surface to be flocked a solution comprising about 40 to 70 parts by weight of a solvent selected from the group consisting of high-boiling esters of glycol ethers and high-boiling liquid ketones, about 30–55 parts by weight of a suitable filler, about 1 to 5 parts by weight of a suitable inorganic thickening agent, about 20 to 35 parts by weight of a copolymer of butadiene and acrylonitrile containing carboxyl groups, and 1 to 5 parts by weight of a polyfunctional imine crosslinker having the formula:

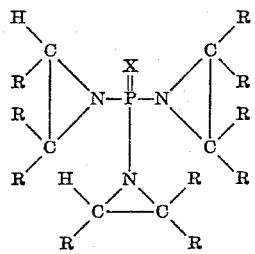

wherein R is a member selected from the group consisting of H, CH$_3$, and C$_2$H$_5$, and X is selected from the group consisting of oxygen and sulfur, (2) flocking the wet surface, (3) heating the coating to a temperature of about 190–210° F. for a period of about ½ to 2 hours, and (4) cooling the article to about room temperature.

4. The article described in claim 1 in which the copolymers of butadiene and acrylonitrile comprise at least one liquid copolymer of butadiene and acrylonitrile containing carboxyl groups.

5. The article described in claim 1 in which the polyfunctional imine crosslinking agent is a compound having the formula

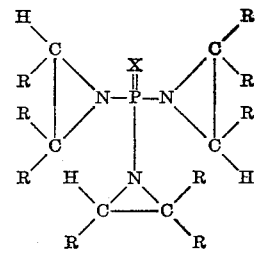

wherein R represents a member selected from the group consisting of H, CH$_3$, and C$_2$H$_5$, and X is selected from the group consisting of oxygen and sulfur.

6. In an article of manufacture, a flocked coating comprising a substrate with adhering flock, the adhesion being due to a binder formed in situ by curing a solution of about 20 to 35 parts by weight of copolymers of butadiene and acrylonitrile containing carboxyl groups in the presence of about 30 to 55 parts by weight of a suitable filler, about 1 to 5 parts by weight of a suitable inorganic thickening agent, about 40 to 70 parts by weight of a suitable solvent, and about 1 to 5 parts of a polyfunctional imine crosslinker having the formula

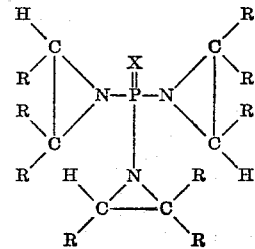

wherein R is a member selected from the group consisting of H, CH$_3$, and C$_2$H$_5$, and X is selected from the group consisting of oxygen and sulfur.

References Cited in the file of this patent

UNITED STATES PATENTS

| | | |
|---|---|---|
| 2,494,920 | Warrick | Jan. 17, 1950 |
| 2,681,292 | Ewing | June 15, 1954 |
| 2,949,386 | Cassel | Aug. 16, 1960 |